(12) United States Patent
Rebel

(10) Patent No.: US 7,315,732 B2
(45) Date of Patent: Jan. 1, 2008

(54) METHOD FOR FREQUENCY CONVERSION AND RECEIVER

(75) Inventor: Reimund Rebel, Ringwood, NJ (US)

(73) Assignee: Atmel Germany GmbH, Heilbronn (DE)

( * ) Notice: Subject to any disclaimer, the term of this patent is extended or adjusted under 35 U.S.C. 154(b) by 552 days.

(21) Appl. No.: 11/043,980

(22) Filed: Jan. 28, 2005

(65) Prior Publication Data

US 2005/0170807 A1    Aug. 4, 2005

(30) Foreign Application Priority Data

Jan. 30, 2004    (DE)    ............ 10 2004 005 503

(51) Int. Cl.
*H04B 1/06*    (2006.01)
(52) U.S. Cl. .................. 455/260; 455/76; 375/376
(58) Field of Classification Search .............. None
See application file for complete search history.

(56) References Cited

U.S. PATENT DOCUMENTS

| | | | |
|---|---|---|---|
| 5,038,117 A * | 8/1991 | Miller | ............ 331/16 |
| 5,467,373 A | 11/1995 | Ketterling | |
| 6,308,049 B1 * | 10/2001 | Bellaouar et al. | ............. 455/76 |
| 6,519,305 B1 | 2/2003 | Roth et al. | |
| 6,708,026 B1 * | 3/2004 | Klemmer et al. | ........... 455/314 |

FOREIGN PATENT DOCUMENTS

| | | |
|---|---|---|
| DE | 31 50 867 A1 | 8/1982 |
| DE | 197 23 175 A1 | 12/1998 |
| DE | 695 23 018 T2 | 6/2002 |

* cited by examiner

*Primary Examiner*—Thanh Cong Le
(74) *Attorney, Agent, or Firm*—MG-IP Law, PLLC

(57) ABSTRACT

A method and device for frequency conversion is disclosed in which a first signal with a first frequency is converted into a second frequency through mixing with a divided oscillator signal and wherein the frequency of the divided oscillator signal stands in a fractional rational ratio to the frequency of the undivided oscillator signal. The method is characterized in that the oscillator signal is divided such that an average value of the divided oscillator signal over time corresponds to half the separation between the extreme values of the divided oscillator signal.

20 Claims, 3 Drawing Sheets

METHOD FOR FREQUENCY CONVERSION AND RECEIVER

This nonprovisional application claims priority under 35 U.S.C. § 119(a) on German Patent Application No. DE 102004 005 503 filed in Germany on Jan. 30, 2004, which is herein incorporated by reference.

BACKGROUND OF THE INVENTION

1. Field of the Invention

The present invention relates to a method for frequency conversion in which a first signal with a first frequency is converted into a second frequency through mixing with a divided oscillator signal and wherein the frequency of the divided oscillator signal stands in a fractional rational ratio to the frequency of the undivided oscillator signal.

In addition, the present invention relates to a receiver, having at least a mixer, an oscillator, and a switchable frequency divider for dividing a frequency of the oscillator by various natural numbers n, m, wherein the mixer mixes a first signal that has a first frequency with a divided signal from the oscillator and thus converts it to a second frequency, and having a control unit that, in a first operating state, periodically switches the switchable frequency divider from a division by the number n to a division by the number m according to a predefined time-slot pattern.

2. Description of the Background Art

A conversion of a first frequency to a second frequency is customary in, for example, receiving systems for radio frequencies. To this end, both the signal at the first frequency and the output signal of the phase-locked loop are supplied to a mixer that outputs as a result the signal at the second frequency (intermediate frequency).

In special applications it is desirable to be able to set a division factor of 1.5. Division by 1.5 corresponds to multiplication by a factor of ⅔, which means that two output pulses are generated from every three input pulses.

It is known to achieve frequency conversion with a fractional rational frequency ratio by division using the fractional-N principle. This principle is used, for example, in phase-locked loops with fractional rational division ratios to convert an oscillator frequency to a reference frequency. Conventional fractional-N dividers generate a fractional rational frequency ratio by periodically removing pulses from a periodic pulse sequence. Conventional fractional-N frequency dividers thus ultimately suppress output pulses in order to express the fractional rational frequency ratio. This creates an asymmetry in the time behavior of the output signal of the phase-locked loop that is associated with a DC component in the output signal. In other words, the average value over time of the output signal then does not correspond to half of the separation of its extreme values. However, a signal that has a DC component is not suitable for operating a mixer. In the prior art, the DC component must therefore be removed by filtering, which makes the preparation of a signal for the mixer complicated.

SUMMARY OF THE INVENTION

It is therefore an object of the present invention to provide a method for preparing a divided signal that stands in a fractional rational ratio to the undivided signal and that is suitable for a mixer without complicated further processing. In addition, the object of the invention is to specify a receiver that prepares and utilizes such a signal.

This object is attained with a method of the type initially mentioned in that the oscillator signal is divided such that the average value of the divided oscillator signal corresponds to half the separation between the extreme values of the oscillator signal. This object is further attained with a receiver of the aforementioned type in that the various natural numbers and the time-slot pattern are predetermined such that the average value of the divided oscillator signal corresponds to half the separation between the extreme values of the oscillator signal.

This object is further attained with a receiver of the aforementioned type in that the various natural numbers and the time-slot pattern are predetermined such that an average value of the divided oscillator signal over time corresponds to half the separation between the extreme values of the divided oscillator signal.

The object of the invention is attained in full through these features. In particular, a divided signal of an oscillator with the required properties is produced without the necessity of further processing to remove a DC component.

In a preferred embodiment, the frequency of the oscillator signal is periodically divided by various natural numbers n, m in accordance with a time-slot pattern.

As a result of this embodiment, no pulses need to be removed from a regular pulse sequence. Instead, the frequency of the divided signal, which has a fractional rational relationship to the undivided signal, results from alternating division by various natural numbers, which produces pulses of differing lengths in the divided signal.

In a further embodiment, the natural number m is twice the natural number n, and for a fixed time-slot pattern with a pulse duty ratio of 50% to be used as the time-slot pattern. It is also preferred that m be equal to 1.

The combination of this pulse duty ratio for all pairs n, m where n=2 m provides an output signal from the phase-locked loop that has the desired characteristics. The combination of n=2 and m=1 results in especially short period durations in the output signal of the phase-lock loop, which accelerates transient response after a switchover of the division factor.

Another preferred embodiment is characterized by an FM radio signal as the first signal and an intermediate-frequency signal as the second signal.

These features characterize a preferred area of application. In this area, the invention—using a division factor of 1.5 with the capability of switchover to other division factors (for example, 2 and/or 3)—opens up the possibility of covering a variety of different regional and application-specific receive frequency ranges with a universal receiver having a simplified construction.

With regard to embodiments of the receiver, it is preferred that the oscillator provides a frequency between 170 MHz and 236 MHz.

This frequency corresponds to approximately twice the oscillator frequency of the automobile radios that are customarily used. The use of such a comparatively high frequency opens up a variety of options for division, which permit simple adaptation to regional and/or application-specific requirements. As a general rule, multiple receivers are operated at the same time in automobile radios. For example, one receiver serves as an audio receiver, while another receiver continuously monitors the quality of reception on alternative frequencies for the station being listened to, in order to facilitate timely switchover. The FM band is approximately 20 MHz wide, and as a general rule a frequency of 10.7 MHz is chosen as the intermediate frequency because inexpensive ceramic filters are commercially available for this frequency. Oscillators are commonly used which oscillate at a frequency that is approximately one intermediate frequency higher than the first frequency, or receive frequency, that is to be received. If the receive frequency is at the lower end of the FM bandwidth, the oscillator oscillates within the receive band. Thus, due to ultimate decoupling of the receiver, an additional receiver will be interfered with if it happens to be operated at this frequency.

In a preferred embodiment, the oscillator frequency is higher than a frequency of the FM radio signal.

As a result of such a constellation, referred to as "high side injection," the range of possible first frequencies that can be converted to an intermediate frequency with few division factors is increased.

It is also preferred that, in a second operating state, the oscillator frequency is continuously divided by 2.

As a result of such a division factor, the FM frequency band between 88 and 108 MHz (first frequency) used in Europe and the USA can be mixed with an output frequency from a phase-locked loop that is approximately one intermediate frequency of 10.7 MHz higher (98 MHz to 118 MHz) in order to convert the first frequency to a second frequency or intermediate frequency of 10.7 MHz.

A further preferred embodiment is characterized in that the oscillator frequency is lower than the first frequency.

Such a constellation, referred to as "low side injection," also increases the range of possible first frequencies that can be converted to an intermediate frequency with few division factors.

It is further preferred that, in a third operating state, the oscillator frequency is continuously divided by 3.

As a result of such a division factor, the FM band between 78 and 98 MHz (first frequency) that is used in Japan can be mixed with an output frequency from a phase-locked loop that is approximately one intermediate frequency of 10.7 MHz lower (68 MHz to 88 MHz) in order to convert the first frequency to a second frequency or intermediate frequency of 10.7 MHz.

Moreover, low side injection in combination with a division factor of 1.5 and an oscillator frequency of up to 236 MHz also permits conversion of a first frequency of approximately 168 MHz to an intermediate frequency of 10.7 MHz, and thus permits reception in this range of first frequencies. This is especially significant for use in the USA because weather information, in particular storm warnings, are broadcast there on a weather band with a narrow bandwidth at approximately 168 MHz.

Overall, the features described provide both a method and a universal receiver that can permit reception in an important weather band in the USA in addition to reception in a normal FM band in the USA and Europe, and also reception in a normal FM band in Japan with a simple change of division factors. In doing so, the method and also the receiver allow the omission of further processing to remove the DC component in the divided signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
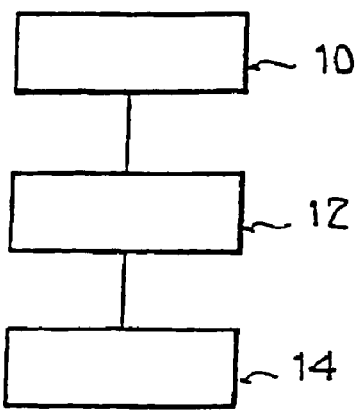
FIG. 1 is a flow chart of a preferred embodiment of the present invention.

FIG. 1 shows a sequence of steps 10, 12, and 14, where an oscillator signal is produced in step 10, is divided in step 12, and is combined in step 14 with a first signal (receive signal) in a mixer.

Figure 2A:
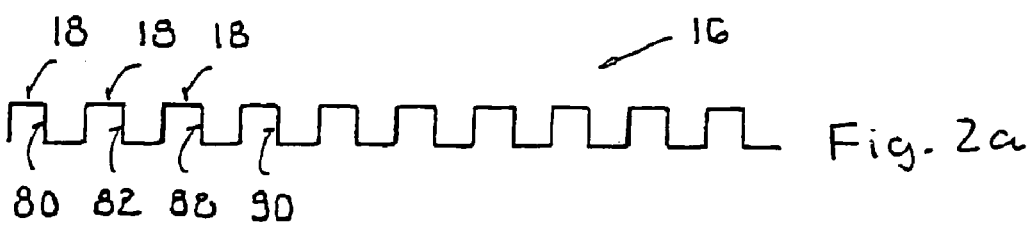
FIGS. 2a-e are timing diagrams of divided and undivided signals.

In a first step 10, an oscillator signal f_O is continuously produced. Such an oscillator signal can, for example, be produced by a phase-locked loop with a voltage-controlled oscillator. The oscillator signal can, for example, be a square-wave signal with a symmetrical pulse duty ratio of 50% and thus has a periodic sequence 16 of square-wave pulses 18, as shown in FIG. 2a.

In step 12, a division of the output signal of the oscillator takes place. A division can, for example, be accomplished by generating, from the periodic sequence 16, a new square wave signal in which a signal level change is triggered by every $n^{th}$ edge (rising or falling) of the oscillator signal.

Figure 2B:
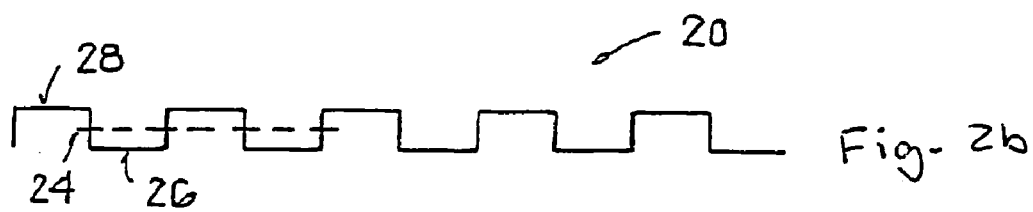
Figure 2C:
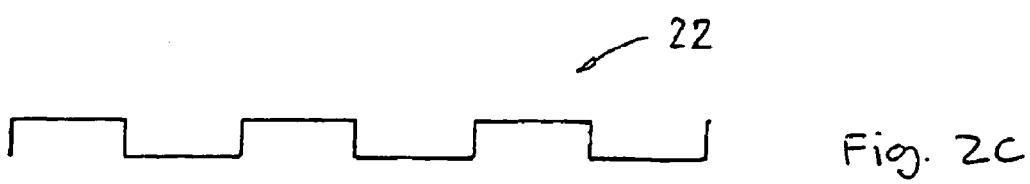

In this way, a halving of the oscillator frequency results when n=2. When n=3, the oscillator frequency is divided by 3. The corresponding result for n=2 is shown in FIG. 2b as a periodic sequence 20, and the result for n=3 is shown in FIG. 2c as a periodic sequence 22. The values n=2 and n=3 represent examples of integer relationships between the oscillator frequency and each one of the divided frequencies. In comparison to the period duration of the oscillator signal, the pulse sequences resulting from the division are periodic, with twice the period duration when n=2 and three times the period duration when n=3. Moreover, their average value over time 24 corresponds to half the distance between their extreme values 26, 28, which are defined here by the low and high levels.

Figure 2D:
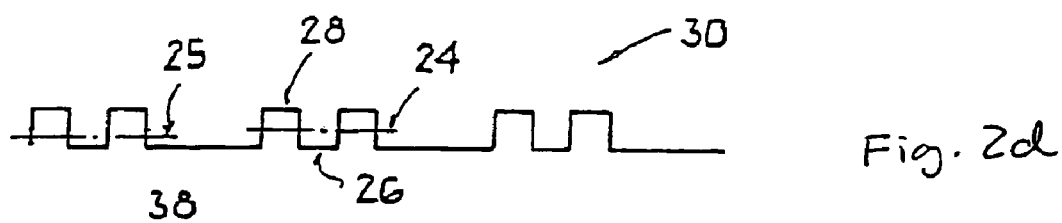

To generate fractional rational ratios, conventionally, individual pulses are removed from the periodic pulse sequences using a so-called modulo divider. This is shown in FIG. 2d using the example of a ratio of 1.5. With such a pattern 30, as is shown in FIG. 2d, the average value over time 25 no longer corresponds to half the distance between the two signal levels 26, 28, but instead is one third of the distance above the lower level 26 and thus is separated from the average value 24 of the two levels 26, 28 by one sixth. This one sixth represents the DC component, which in a subsequent combination with another signal in a mixer has an interfering effect.

Figure 2E:
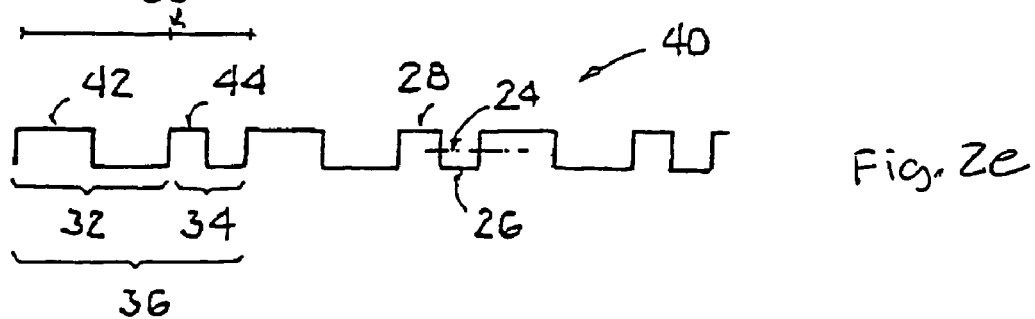

In accordance with a preferred embodiment of the invention, the fractional rational ratio is already set by the method of division in step 12 such that the interfering DC component does not appear. This is shown in FIG. 2e. To this end, the signal is initially divided by a factor n during a first time slot 32, where n is a natural number and the division takes place in a manner analogous to the examples described above for values of 2 and 3.

Then, in a second time slot 34, a division by a factor m takes place, where m is also an element of the natural numbers. In the example in FIG. 2e, n=2 and m=1. The division here by the factor n takes place in each case until the divided signal encompasses a full period 32 associated with the factor 2. This period 32 then constitutes a first partial period 32 of the complete divided signal. Subsequently, division by the factor 1 is performed until the resulting divided signal encompasses a corresponding full period 34. This period 34 constitutes a second partial period 34 of the complete divided signal. The sum of the two partial periods 32, 34 then results in a full period 36 of the complete divided signal. The number 38 designates the time slot pattern in which switching from division by the number n to division by the number m, and back again, takes place.

The divided signal 40 generated in this way has two pulses 42, 44 for every three pulses 18 of the undivided oscillator signal and thus, like the signal 30 from FIG. 2d, corresponds to a fractional rational division ratio of 1.5 (multiplication by ⅔). However, in contrast to the signal 30 from FIG. 2d, the signal 40 visibly has an average value over time 24 that is one half of the distance between its signal levels, which here, too, constitute the extreme values 26, 28 of the signal 40. The signal 40 thus has no interfering DC component and can be used in a subsequent step 14, without any additional process steps such as filtering, to convert a receive signal with a first frequency to a second frequency (intermediate frequency).

This sequence of steps 10, 12, and 14 thus represents an example embodiment of a method for frequency conversion in which a first signal with a first frequency is converted to a second frequency by mixing with a divided oscillator signal 40, and where the frequency of the divided oscillator signal 40 has a fractional rational ratio to the frequency of the undivided oscillator signal 16, and where the oscillator signal 16 is divided such that the average value of the divided oscillator signal 40 corresponds to half the distance between the extreme values 26, 28 of the divided oscillator signal 40.

Although the method has been explained for numbers n=2 and m=1, it is a matter of course that the method is not restricted to these particular values, but rather can be used with any desired natural numbers for which a complete respective period results in a vanishing DC component. These conditions are always met, for example, when the larger number is twice the smaller number and a pulse duty ratio of 50% is maintained for each one. In this regard, the pulse duty ratio is understood to be the ratio of the time with high signal level 28 to the total duration of a signal segment being examined. A pulse duty ratio of 50% automatically results whenever division by a specific factor is always executed for a duration such that integer multiples of partial periods 32 of the divided signal 40 are present, and division by the other factor is executed for the same number of partial periods. In the example in FIG. 2d, the integer number is 1.

The invention is preferentially used for conversion of an FM radio signal (FM=frequency modulation) to an intermediate frequency in an FM receiver. An example embodiment of such an FM receiver is shown in FIG. 3.

The basic task of a receiver is to select a portion of a frequency spectrum and demodulate the signal voltage contained therein. A distinction is drawn in this regard between direct-detection receivers and superheterodyne receivers. In the direct-detection receiver, demodulation takes place at the frequency of the received signal. The receive frequency is selected by one or more bandpass filters. Adequate adjacent-channel selectivity requires multiple filter circuits, which sharply increases the expense for reception of different frequencies.

The superheterodyne receiver avoids this disadvantage by converting different receive frequencies to one intermediate frequency. Using a mixer, different frequency spectra can be converted to a uniform intermediate frequency of, for example, 10.7 MHz by varying the divided oscillator frequency. Demodulation takes place at the intermediate frequency stage.

Figure 3:
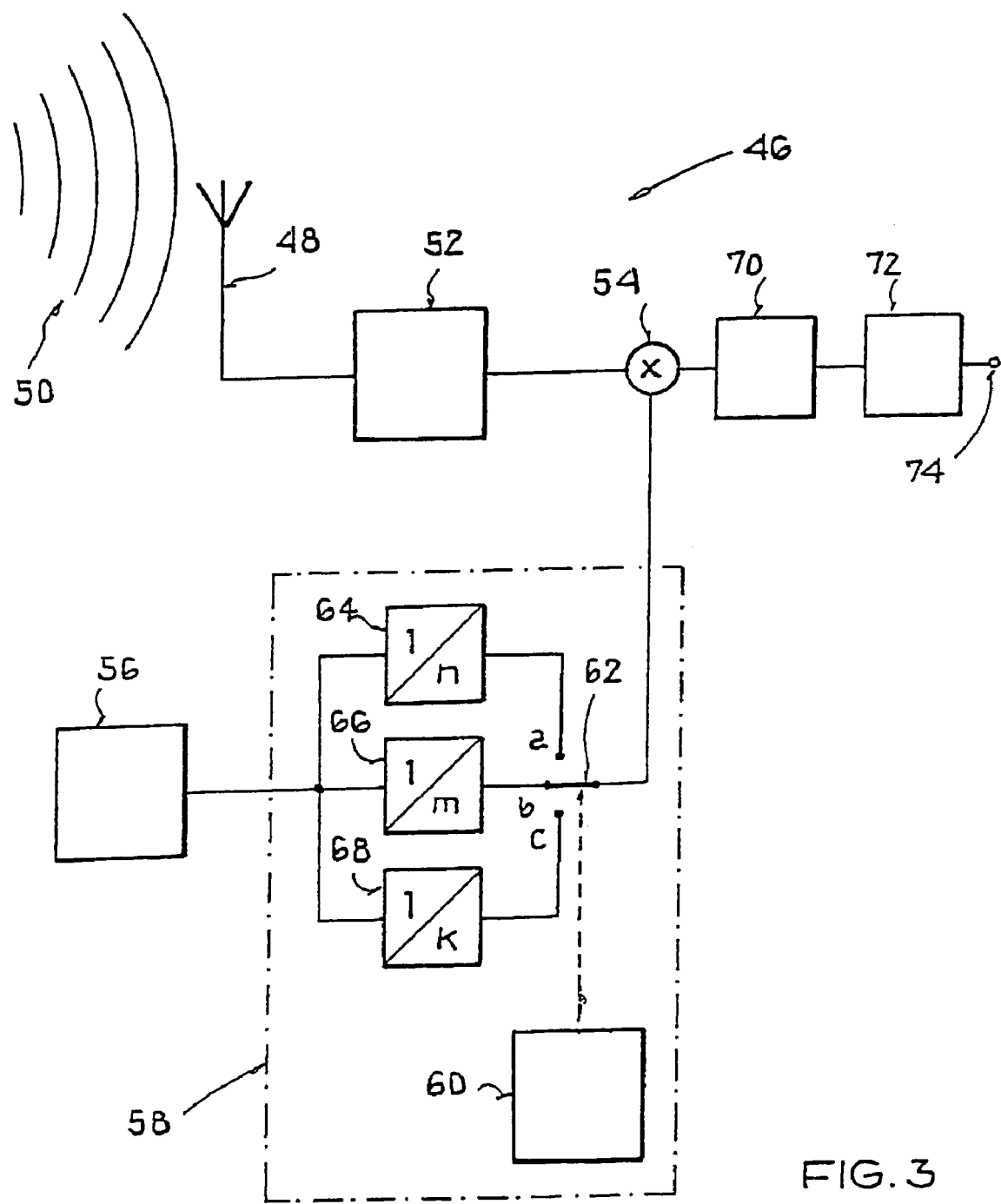
FIG. 3 is a schematic illustration of a receiver according to an embodiment of the invention.

FIG. 3 shows a receiver 46 with an antenna 48 that receives an FM signal 50 at a first frequency. If necessary, the received signal is amplified by a low-noise amplifier 52 and is fed to a mixer 54. A divided oscillator signal 20, 22, 40 or an undivided oscillator signal 16, which is to say a signal such as is qualitatively depicted in FIG. 2, is also fed to the mixer 54.

To this end, an undivided oscillator frequency is first generated in a local oscillator 56 and is divided by a subsequent programmable frequency divider 58. The local oscillator 56 has, for example, a voltage controlled oscillator (VCO) that outputs a signal with a frequency f_O. This oscillator frequency LO depends on a DC voltage with which the oscillator can be controlled. To set a stable frequency f_O, the output signal with frequency LO is tapped by a programmable frequency divider, for example as part of a phase-locked loop that is not explicitly shown, and is compared to a reference signal in a phase/frequency detector. The reference signal can be generated by a quartz oscillator, for example. Differences in phase position generate correction pulses which, after filtering by a loop filter, change the control voltage for the oscillator. Deviations in the frequency of the divided output signal from the reference frequency thus produce a control intervention that causes the divided output signal to settle at the reference frequency. If the signals are in phase, then their frequencies also match. The phase-locked loop is then locked at the frequency f_O. The local oscillator 56 then supplies a signal 16 corresponding to the schematic representation in FIG. 2a with a frequency f_O to the frequency divider 58, for example.

The frequency divider 58 is designed such that it implements at least one fractional rational division ratio. In the example in FIG. 3, the frequency divider 58 has a control unit 60, which in each case selects one of three possible dividers 64, 66 or 68 by, for example, a switch 62. The divider 64 has the value n, the divider 66 has the value m and the divider 68 has the value k. Similarly, the switch 62 can have three possible switch settings a, b and c, where switch setting a is associated with divider 64, switch setting b is associated with divider 66, and switch setting c is associated with divider 68. In the discussion below, it is assumed that k=3, m=2, and n=1. However, it is understood that k, m and n can also take on other natural number values. It is further understood that the dividers 64, 66, 68 and the switch 62 can be implemented not only as circuit structures, but also preferably as program modules of a control program.

An FM signal 50 with a first frequency, which is received through the antenna 48, is first amplified by the amplifier 52 and is then converted to an intermediate frequency in a mixer 54 by combination with an oscillator frequency provided by the frequency divider 58. The signals converted to the intermediate frequency are filtered by a subsequent selective channel filter 70 and, after demodulation in a demodulator 72, are delivered to a receiver output 74 for further processing.

Figure 4:
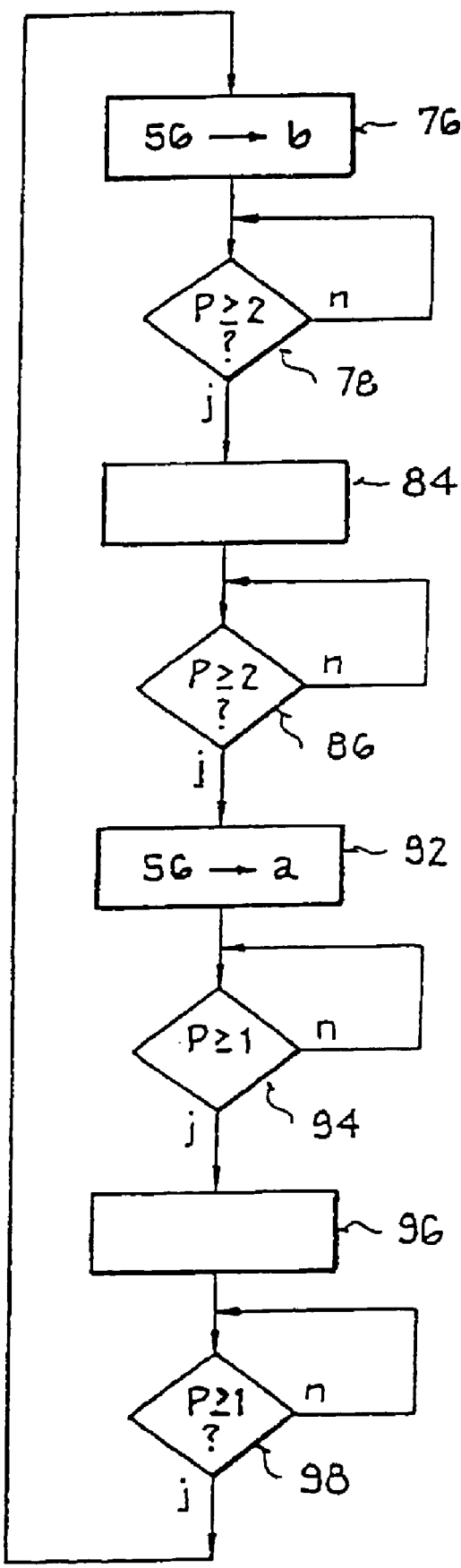
FIG. 4 is a program flow chart illustrating the method according to a preferred embodiment of the present invention.

The program shown in FIG. 4, for example, can be executed to generate a divided signal 40 in accordance with the schematic representation in FIG. 2e. To do so, the switch 62 is first switched to the position b in a step 76, and the divider 66, which in this design is implemented as a counter, is initialized. It then provides a constant level 28 until it has registered two falling edges 80, 82 of the undivided oscillator signal 16 in a step 78, for example. See also FIG. 2a. To this end, step 78 tests whether a number p of falling edges is greater than or equal to 2. If this is the case, the output of the counter 66 is toggled to the level 26 in a step 84 and step 86 again waits for p=2 falling edges 88, 90 in the oscillator signal 16 (see also FIG. 2a). The control unit 60 then switches the switch 62 to the position a, which corresponds to a division by n=1, in a step 92. In steps 94 through 98, the counter 64 counts two times to one and in the middle toggles its output level in a step 96. Repetition of this sequence of steps 76 through 98 results in the divided oscillator signal 40 shown as the signal in FIG. 2e. Instead of counting only falling edges, it is also possible to count only rising edges, or even all edges.

The frequency of the local oscillator 56 is set to a range between 170 MHz and 236 MHz for a universal FM receiver 46, for example. Division by the factor 1.5 then produces a frequency of the divided signal of approximately 158 MHz for the upper band limit of 236 MHz. In a low side injection constellation, in which the divided oscillator frequency used for the mixer 54 is lower than a receive frequency (first frequency) by approximately the value of the intermediate frequency (approximately 10.7 MHz), this signal is suitable for combination with a first frequency of approximately 168 MHz. This is a frequency such as is used in the American weather band. Accordingly, the receiver can be used in a first operating state to receive signals from this FM frequency band.

In a second operating state, the control unit 60 continuously switches the switch 62 to the position b, which implements a divider 66 with the value 2. As a result, a frequency of 170/2 MHz=approx. 85 MHz to 236/2 MHz=approx. 118 MHz is delivered to the mixer 54, which converts frequencies from approximately 75 MHz to approximately 108 MHz as selected first frequencies to the intermediate frequency in a high side injection constellation. These frequency relationships correspond approximately to the FM band used in Europe.

In a third operating state, the control unit 60 continuously switches the switch 62 to the position c, which implements a divider with the value 3. As a result, a frequency of 170/3 MHz=approx. 53 MHz to 236/3 MHz=approx. 79 MHz is delivered to the mixer 54. This converts frequencies from approximately 63 MHz to approximately 80 MHz as selected first frequencies to the intermediate frequency in a low side injection constellation. These frequency relationships correspond approximately to the FM band used in Japan.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for frequency conversion in which a first signal having a first frequency is converted into a second signal, the method comprising the steps of:
   dividing an undivided oscillator signal such that an average value of a divided oscillator signal over time corresponds to half of a separation between extreme values of the divided oscillator signal; and
   mixing the first signal with the divided oscillator signal to produce the second signal,
   wherein a frequency of the divided oscillator signal is a fractional rational ratio of a frequency of the undivided oscillator signal.

2. The method according to claim 1, wherein the frequency of the undivided oscillator signal is periodically divided by various natural numbers n, m in accordance with a time-slot pattern.

3. The method according to claim 2, wherein the natural number n is twice the natural number m, and wherein a fixed time-slot pattern with a pulse duty ratio of 50% is used as the time-slot pattern.

4. The method according to claim 2, wherein m is equal to 1.

5. The method according to claim 1, wherein the first signal is an FM radio signal and the second signal is an intermediate-frequency signal.

6. A receiver comprising:
   a mixer;
   an oscillator; and
   a switchable frequency divider for dividing a frequency of the oscillator by various natural numbers n, m,
   wherein the mixer mixes a first signal that has a first frequency with a divided signal from the oscillator to produce a second frequency,
   wherein a control unit that, in a first operating state, periodically switches the switchable frequency divider from a division by the number n to a division by the number m according to a predefined time-slot pattern, and
   wherein the various natural numbers and the time-slot pattern are predetermined such that an average value of the divided oscillator signal over time corresponds to half the separation between the extreme values of the divided oscillator signal.

7. The receiver according to claim 6, wherein the natural number n is twice the natural number m, and wherein the time-slot pattern is a fixed time-slot pattern with a pulse duty ratio of 50%.

8. The receiver according to claim 7, wherein m is equal to 1.

9. The receiver according to claim 6, wherein the first signal is an FM radio signal and the second signal is an intermediate-frequency signal.

10. The receiver according to claim 6, wherein the oscillator provides a frequency between 170 MHz and 236 MHz.

11. The receiver according to claim 9, wherein the oscillator frequency is lower than a frequency of the FM radio signal.

12. The receiver according to claim 6, wherein, in a second operating state, the oscillator frequency is continuously divided by 2.

13. The receiver according to claim 6, wherein the oscillator frequency is higher than the first frequency.

14. The receiver according to claim 6, wherein, in a third operating state, the oscillator frequency is continuously divided by 3.

15. The receiver according to claim 14, wherein the oscillator frequency is lower than the first frequency.

16. A method for dividing an undivided signal, the method comprising the steps of:
   separating a period of the undivided signal into a first time period and a second time period;

dividing the first time period by a factor n, the factor n being an integer;

dividing the second time period by a factor m, the factor m being an integer; and combining the first time period and the second time period to produce a divided signal that has a period that is a fractional rational ratio, wherein the factor n is greater than the factor m, and wherein an average of the period of the divided signal is one-half of a sum of high levels and low levels of the period of the divided signal.

17. The method according to claim 16, wherein the undivided signal has a substantially symmetrical pulse.

18. The method according to claim 16, wherein the undivided signal is generated by an oscillator.

19. A mixer comprising:

a first input for receiving a first signal;

a second input for receiving a divided signal; and an output for outputting an intermediate signal, the intermediate signal being produced by combining the first signal with the divided signal, wherein the divided signal has a period that is a fractional rational ratio, and wherein an average of the period of the divided signal is one-half of a sum of high levels and low levels of the period of the divided signal.

20. The mixer according to claim 19, wherein the first signal is received by an antenna, and wherein the divided signal is generated from an undivided signal that has a symmetrical clock pulse and that is generated by an oscillator.

* * * * *